United States Patent [19]
Kasari et al.

[11] Patent Number: 6,165,621
[45] Date of Patent: Dec. 26, 2000

[54] METHOD FOR FORMING MULTI-LAYER METALLIC COATING FILM

[75] Inventors: Akira Kasari, Hiratsuka; Hiroaki Oda, Kitakyushu; Mitsugu Endo, Ashigarakami-gun; Mikio Shimakawa; Tetsuya Yokoyama, both of Hiratsuka, all of Japan

[73] Assignee: Kansai Paint Co., Ltd., Amagasaki, Japan

[21] Appl. No.: 09/000,239

[22] PCT Filed: Jun. 3, 1997

[86] PCT No.: PCT/JP97/01885

§ 371 Date: Feb. 6, 1998

§ 102(e) Date: Feb. 6, 1998

[87] PCT Pub. No.: WO97/47396

PCT Pub. Date: Dec. 18, 1997

[30] Foreign Application Priority Data

Jun. 14, 1996 [JP] Japan ................................. 8-153518
Aug. 29, 1996 [JP] Japan ................................. 8-227906

[51] Int. Cl.$^7$ .................................. B05D 7/16; B05D 5/06
[52] U.S. Cl. ...................... 428/457; 427/388.2; 427/409; 427/419.5; 427/380; 428/204
[58] Field of Search ................................. 427/407.1, 409, 427/410, 142, 388.2, 380, 419.5; 428/457, 204

[56] References Cited

U.S. PATENT DOCUMENTS

| | | | |
|---|---|---|---|
| 5,064,695 | 11/1991 | Hotta et al. ........................ | 427/407.1 |
| 5,556,527 | 9/1996 | Igarashi et al. ........................ | 427/409 |
| 5,676,813 | 10/1997 | Nakamura et al. ..................... | 427/409 |
| 5,698,310 | 12/1997 | Nakamura et al. ................... | 427/407.1 |
| 5,718,950 | 2/1998 | Komatsu et al. ........................ | 427/409 |
| 5,821,314 | 10/1998 | Ikushima et al. ........................ | 528/18 |
| 5,827,575 | 10/1998 | Kasari et al. ........................... | 427/409 |
| 5,871,827 | 2/1999 | Jaffe et al. ........................... | 427/407.1 |

*Primary Examiner*—Shrive Beck
*Assistant Examiner*—Kirsten A. Crockford
*Attorney, Agent, or Firm*—Armstrong, Westerman, Hattori, McLeland & Naughton

[57] ABSTRACT

A method for forming a multi-layer metallic coating film, the method being a 3-coat system comprising the steps of applying the following coating compositions (A), (B) and (C) in this order to a metal substrate coated with a cationically electrodepositable coating composition; (A) an organic solvent-based thermosetting metallic first base coating composition which comprises a neutralized carboxyl-containing resin having an acid value of 5 to 100 mg KOH/g, an amino resin and a metallic pigment, the composition having a substrate-hiding power corresponding to up to 3% transmittance of light at a wavelength of 400 to 700 nm in a 15 $\mu$m-thick cured coating film, (B) an aqueous thermosetting second base coating composition which has a transparency corresponding to 10 to 95% transmittance of light at a wavelength of 400 to 700 nm in a 15-$\mu$m thick cured coating film, and (C) an organic solvent-based thermosetting clear coating composition. The method of the invention gives a multi-layer metallic coating film on a metal substrate, the film being improved in esthetic property, surface smoothness and so on.

6 Claims, No Drawings

METHOD FOR FORMING MULTI-LAYER
METALLIC COATING FILM

TECHNICAL FIELD OF THE INVENTION

The present invention relates to a novel method for forming a multi-layer metallic coating film.

BACKGROUND ART

A metallic coating film sparkles when there occur reflections from light rays incident on a metallic pigment in the coating film. Metallic coating films have an esthetically attractive appearance of their own with wide variations as in color, and are chiefly applied to metal articles such as automobiles, motor cycles and the like.

A 3-coat 1-bake coating method for forming a metallic coating film is known from Japanese Examined Patent Publication No.25076/1992, the method comprising applying an organic solvent-based thermosetting coating composition comprising a neutralized carboxyl-containing resin having an acid value of 5 to 100 mgKOH/g and an amino resin, adjusting the coating layer to a specific viscosity range, applying an aqueous thermosetting metallic coating composition, applying an organic solvent-based thermosetting clear coating composition, and heating the coatings for curing at the same time.

According to the foregoing conventional coating method, the first layer of organic solvent-based thermosetting coating composition is adjusted to a specific viscosity range while the second layer of aqueous thermosetting metallic coating composition is formed on the viscosity-adjusted first layer, whereby advantageously the amount of the organic solvent can be reduced and the unevenness of metallic effect can be prevented without degrading the esthetic property or surface smoothness of coating film which would occur because of surface roughening and sagging at varied humidities.

However, the foregoing conventional method has drawbacks that the obtained metallic coating film appears flat and deficient in depth feeling, and is not always satisfactory in distinctness-of-image gloss, namely insufficient in esthetic property.

DISCLOSURE OF THE INVENTION

An object of the present invention is to provide a novel method of forming a multi-layer metallic coating film which retains the above-mentioned advantages of conventional coating methods but is free of their drawbacks.

Another object of the invention is to provide a novel method capable of forming a multi-layer metallic coating film on a metal substrate, the film being enhanced in depth feeling and in distinctness-of-image gloss, consequently improved in esthetic property and surface smoothness.

Other features of the invention are apparent from the following description.

According to the present invention, there is provided a method for forming a multi-layer metallic coating film, the method being characterized by a 3-coat system comprising the steps of applying the following coating compositions (A), (B) and (C) in this order to a metal substrate coated with a cationically electrodepositable coating composition; (A) an organic solvent-based thermosetting metallic first base coating composition which comprises a neutralized carboxyl-containing resin having an acid value of 5 to 100 mgKOH/g, an amino resin and a metallic pigment, the composition having a substrate-hiding power corresponding to not higher than 3% transmittance of light at a wavelength of 400 to 700 nm in a 15 am-thick cured coating film, (B) an aqueous thermosetting second base coating composition which shows a transparency corresponding to 10 to 95% transmittance of light at a wavelength of 400 to 700 nm in a 15-pm thick cured coating film, and (C) an organic solvent-based thermosetting clear coating composition.

The present inventors conducted extensive research to overcome the drawbacks of conventional methods while retaining the above-mentioned prior art advantages, and obtained the following novel findings.

(1) When the 3-coat system is conducted which comprises applying (A) the first base coating composition having the above-specified hiding power, (B) the second base coating composition having the above-specified transparency and (C) the clear coating composition in this order, there is formed a multi-layer metallic coating film which is improved in depth feeling and distinctness-of-image gloss and therefore superior in esthetic property.

(2) When the second base coating composition (B) is applied, the neutralized carboxyl-containing resin in the first base coating composition (A) exhibits a high water absorbing capacity and absorbs water from the coating composition (B) on the composition (A), resulting in rapidly increased viscosity of the composition (B). The film flaws of sagging at a high humidity and surface roughening at a low humidity can be avoided owing to the foregoing feature and a high wettability of the composition (B) toward the composition (A). Consequently the amount of the organic solvent to be used can be reduced without degradation of esthetic property or surface smoothness of coating film due to the change of humidity.

(3) The metallic first base coating composition (A) is in an organic solvent form so that there is no likelihood of producing the unevenness of metallic effect.

The present invention was completed based on these novel findings.

The method for forming a metallic coating film according to the present invention is described below in more detail.

Metal substrates to be coated by the method of the invention are those coated by cationic electrodeposition. Useful metal substrates are not limited insofar as they are those which can be coated by cationic electrodeposition. Specific examples of useful metal substrates are those of iron, copper, aluminum, tin, zinc or like metals, alloys containing such metals, metal parts plated with such metals, those coated with such metals by vapor deposition, bodies of automobiles, trucks, motor cycles, buses or the like having such metal parts, electric appliances, etc. These metal substrates are preferably those subjected to chemical conversion treatment with phosphate, chromate or the like.

The cationically electrodepositable coating compositions to be applied to metal substrates are not limited and include various types of cationically electrodepositable coating compositions heretofore known, such as coating compositions comprising as a main component an aqueous resin, e.g. an epoxy resin, acrylic resin, polybutadiene resin or the like which is modified with an amino group-containing compound and neutralized with a neutralizing agent, optionally the composition containing a crosslinking agent such as blocked polyisocyanate, alicyclic epoxy resin or the like, a coloring pigment, an anticorrosive pigment, an extender pigment, a hydrophilic organic solvent or the like. Examples of useful neutralizing agents are acetic acid, hydroxylacetic acid, propionic acid, butylic acid, lactic acid, glycine and like organic acids, and sulfuric acid, hydrochloric acid, phosphoric acid and like inorganic acids.

The cationically electrodepositable coating composition is diluted with deionized water or the like to a solids content of about 5 to about 40% by weight and is applied at a pH range of 5.5 to 8.0 in the conventional manner. Then the coated substrate is heated to a temperature of about 140 to about 210° C. for curing. A preferred film thickness is about 10 to about 60 4m when cured.

If necessary, an intercoat composition may be applied to the coating layer of cationic electrodepositable composition. Suitable intercoat compositions include, for example, thermosetting coating compositions comprising a base resin, a crosslinking agent and a solvent as main components and optionally additives for coating compositions such as coloring pigments, extender pigments and the like.

Base resins to be incorporated in the intercoat composition include, for example, acrylic resins, polyester resins and the like which have a crosslinkable functional group. Useful crosslinking agents include, for example, melamine resins, urea resins, polyisocyanate compounds and blocked polyisocyanate compounds. Useful solvents are, for example, organic solvents and water.

The intercoat composition may be applied to a substrate covered with a cationically electrodepositable coating composition by electrostatic coating, air spray, airless spray or other coating methods. A preferred intercoat thickness is 10 to 50 Am when cured. The intercoat layer is cured by crosslinking when heated at about 100 to about 150° C.

The metallic first base coating composition (A) to be used in the method of the invention is applied to the cured surface of electrodeposited composition or intercoat composition layer on the metal substrate. It is an organic solvent-based thermosetting coating composition having a substrate-hiding power corresponding to up to 3% transmittance of light at a wavelength of 400 to 700 nm in a cured coating film of 15 Mm thickness (which may be hereinafter called simply "light transmittance"). The first base coating composition (A), coupled with the second base coating composition (B) having a transparency corresponding to a light transmittance of 10 to 95% and the clear coating composition (C), is capable of imparting markedly improved depth feeling and distinctness-of-image gloss to the coating film, resulting in the formation of an esthetically superior multi-layer metallic coating film. The first base coating composition (A) allows the second base coating composition (B) to form a uniform and smooth-surfaced coating layer without influence from atmospheric humidity.

The first base coating composition (A) to be used in the invention contains as a base resin a carboxyl-containing resin having an acid value of 5 to 100 mgKOH/g. The carboxyl-containing resin useful herein can be any of conventional various resins which can fulfil such requirement. Typical examples of carboxyl-containing resins are given below.

(i) Typical examples include acrylic resins and vinyl resins prepared by copolymerizing at least one of carboxyl-containing polymerizable unsaturated monomers, optionally at least one of hydroxyl-containing polymerizable unsaturated monomers and other polymerizable unsaturated monomers, the resins preferably having a number average molecular weight of about 5,000 to about 40,000.

Preferred examples of the carboxyl-containing polymerizable unsaturated monomer are α,β-ethylenically unsaturated carboxylic acids such as acrylic acid, methacrylic acid, maleic acid, itaconic acid, crotonic acid and the like.

Examples of the hydroxyl-containing polymerizable unsaturated monomers to be optionally used are hydroxyalkyl (having 2 to 8 carbon atoms) esters of (meth)acrylic acids such as 2-hydroxyethyl (meth)acrylate, 2-hydroxypropyl (meth)acrylate, 3-hydroxypropyl (meth) acrylate and hydroxybutyl (meth)acrylate; monoesters of polyether polyols such as polyethylene glycol, polypropylene glycol or polybutylene glycol with unsaturated carboxylic acids such as (meth)acrylic acid; monoethers of such polyether polyols with hydroxyl-containing unsaturated compounds such as 2-hydroxyethyl (meth)acrylate; addition reaction products of α,β-unsaturated carboxylic acids with monoepoxy compounds such as "Cardula E1O" (trade name, product of Shell Chemical Co., Ltd.) or α-olefin epoxide; addition reaction products of glycidyl (meth) acrylate with monobasic acids such as acetic acid, propionic acid, p-t-butylbenzoic acid and fatty acids; monoesters or diesters of acid anhydride group-containing unsaturated compounds such as maleic anhydride and itaconic anhydride with glycols such as ethylene glycol, 1,6-hexanediol and neopentyl glycol; hydroxyalkyl vinyl ethers such as hydroxyethyl vinyl ether; chlorine- and hydroxyl-containing monomers such as 3-chloro-2-hydroxypropyl (meth) acrylate; allyl alcohol and so on. Examples of other polymerizable unsaturated monomers are alkyl or cycloalkyl (having 1 to 24 carbon atoms) esters of (meth)acrylic acids such as methyl (meth)acrylate, ethyl (meth)acrylate, n-butyl (meth)acrylate, i-butyl (meth)acrylate, t-butyl (meth) acrylate, cyclohexyl (meth)acrylate, 2-ethylhexyl (meth) acrylate, lauryl (meth)acrylate, stearyl (meth)acrylate and decyl (meth)acrylate; (meth)acrylamides such as (meth) acrylamide, N-methyl (meth)acrylamide, N-ethyl (meth) acrylamide, diacetone acrylamide, N-methylol (meth) acrylamide and N-butoxymethyl (meth)acrylamide; glycidyl group-containing vinyl monomers such as glycidyl (meth) acrylate, glycidyl (meth)acrylamide and allyl glycidyl ether; vinyl monomers such as styrene, vinyltoluene, vinyl propionate, a-methylstyrene, vinyl acetate, (meth) acrylonitrile, vinyl pivalate and "VeoVa" monomer (trade name, product of Shell Chemical Co., Ltd.).

(ii) Typical examples of the carboxyl-containing resin further include oil-free polyester resins prepared by condensing an alcohol component and an acid component; and oil-modified polyester resins prepared by reacting an alcohol component, an acid component and an oil component, these resins preferably having a number average molecular weight of about 500 to about 10,000.

The alcohol component can be a polyhydric alcohol or optionally may be used in combination with a monohydric alcohol, monoepoxy compound or the like. Examples of polyhydric alcohols are glycols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-4,5-pentanediol, 2,2,4-trimethyl-1,3-pentanediol, 1,6-hexanediol, 1,5-hexanediol, 1,4-hexanediol, 2,5-hexanediol, 1,4-cyclohexanedimethanol, neopentyl glycol and neopentyl glycol ester of hydroxypivalic acid; polyester diols such as polylactone diol prepared by reacting these glycols with E-caprolactone or like lactones, and bis(hydroxyethyl) terephthalate; polyether diols such as alkylene oxide addition reaction products of bisphenol A, polyethylene glycol, polypropylene glycol and polybutylene glycol, and like dihydric alcohols. Examples of polyhydric alcohols also include trihydric or higher polyhydric alcohols such as glycerin, trimethylol propane, trimethylol ethane, diglycerin, triglycerin, 1,2,6-hexanetriol, pentaerythritol, dipentaerythritol, sorbitol and mannitol, polylactone polyols such as addition reaction products of these polyhydric alcohols with lactones such as ε-caprolactone; and alicyclic polyhydric alcohols such as 1,4-cyclohexanedimethanol, tricyclodecanedimethanol, hydrogenated bisphenol A or hydrogenated bisphenol F, alkylene oxide addition reaction product of hydrogenated bisphenol A, and alkylene oxide addition reaction product of hydrogenated bisphenol F. The monoepoxide compound to be optionally used in combination includes, for example, propylene oxide, butylene oxide and like α-olefin epoxide, and "Cardula E10" (trade name, product of Shell Chemical Co., Ltd., glycidyl ester of highly branched unsaturated fatty acid).

The acid component may be a polybasic acid and optionally may be used in combination with monobasic acid. Useful polybasic acids are, for example, phthalic anhydride, isophthalic acid, tetrahydrophthalic anhydride, hexahydrophthalic anhydride, maleic anhydride, succinic anhydride, adipic acid, sebacic acid, trimellitic anhydride and pyromellitic anhydride. Examples of monobasic acids to be optionally used in combination are aromatic monobasic acids such as benzoic acid, methylbenzoic acid and p-t-butylbenzoic acid; saturated or unsaturated fatty acids of 1 to 24 carbon atoms such as formic acid, acetic acid, lactic acid, propionic acid, butyric acid, caproic acid, caprylic acid, pelargonic acid, capric acid, undecanoic acid, lauric acid, myristic acid, palmitic acid, stearic acid, cyclohexanecarboxylic acid, 9-decenoic acid, oleic acid, eleostearic acid, elaidic acid, brassidic acid, linoleic acid and linolenic acid; and hydroxycarboxylic acids such as dimethylolpropionic acid, hydroxypivalic acid, 12-hydroxydodecanoic acid, 12-hydroxystearic acid, ricinoleic acid, para-hydroxybenzoic acid, salicylic acid and 4,4-bis(4'-hydroxyphenyl)pentanoic acid. Also usable as the monobasic acid component are lower alkyl esters of these monobasic acids, glycerides and cyclic ester compounds such as ε-caprolactone, γ-valerolactone and like lactones.

Examples of the oil component are fats and oils such as castor oil, tung oil, safflower oil, soybean oil, linseed oil, tall oil, coconut oil, and fatty acids of these fats and oils.

(iii) Typical examples of the carboxyl-containing resin also include graft resins prepared by grafting acrylic resins or vinyl resins to polyester resins such as graft copolymers prepared by polymerizing a vinyl monomer and/or an acryl monomer with polyester resins having a polymerizable unsaturated group, these resins preferably having a number average molecular weight of about 5,000 to about 40,000.

The carboxyl-containing resin essentially has an acid value of 5 to 100 mgKOH/g. If the acid value is lower than 5 mgKOH/g, the first base coating composition (A) is incompatible with the second base coating composition (B) on the composition (A) and absorbs water from the composition (B) in a lower degree, resulting in problems of flow irregularities and sagging of composition (B) and in degraded esthetic property and surface smoothness of coating film. Hence it is undesirable. On the other hand, an acid value of more than 100 mgKOH/g reduces the water resistance of coating film and is hence undesirable. A preferred acid value is 10 to 50 mgKOH/g, and a more preferred acid value is 30 to 50 mgKOH/g.

The carboxyl-containing resin may incorporate a hydroxyl group. The resin containing a hydroxyl group improves film properties such as hardness, water resistance and weatherability with advantages. Hydroxyl groups can be easily introduced when a carboxyl-containing polymerizable unsaturated monomer is used conjointly with a hydroxyl-containing polymerizable unsaturated monomer in the production of the resin in item (i). In view of improved film properties, it is suitable to use a resin having a hydroxyl value of preferably about 10 to about 200 mgKOH/g, more preferably 25 to 70 mgKOH/g.

The carboxyl-containing resin is neutralized with a neutralizing agent before use. Useful neutralizing agents include, for example, basic substances such as ammonia, methylamine, ethylamine, dimethylamine, diethylamine, trimethylamine, triethylamine, dimethylethanolamine, diethanolamine and triethanolamine. The amount of the neutralizing agent to be used is preferably about 0.1 to about 2.0 equivalents, more preferably about 0.3 to about 1.2 equivalents, per equivalent of the carboxyl group in the resin. If the amount is less than 0.1 equivalent, the first base coating composition (A) is incompatible with the second base coating composition (B) on the composition (A) and absorbs water from the composition (B) in a lower degree, resulting in flow irregularities and sagging of composition (B) and in degraded esthetic property and surface smoothness of coating film. Hence it is undesirable. On the other hand, an amount of more than 2.0 equivalents reduces the water resistance of coating film and is hence undesirable.

An amino resin is used as a crosslinking agent for the carboxyl-containing resin in the first base coating composition (A).

Examples of the amino resin to be used include methylolated amino resins prepared by a reaction between an amino component and an aldehyde component, and such methylolated amino resin etherified with a monohydric alcohol. These amino resins may contain a carboxyl group. In the reaction process, the amino component and the aldehyde component are subjected to a condensation reaction in the conventional manner at an alkalinity or acidity using about 0.5 to about 2.0 equivalents of aldehyde group per equivalent of amino group and a pH adjustor (such as ammonia, sodium hydroxide, amines or the like). Examples of the amino component are melamine, urea, benzoguanamine, acetoguanamine, steroguanamine, spiroguanamine, dicyandiamide and the like. Examples of the aldehyde component are formaldehyde, paraformaldehyde, acetoaldehyde and benzaldehyde. Examples of the monohydric alcohol are monohydric alcohols having 1 to 8 carbon atoms such as miethyl alcohol, ethyl alcohol, n-propyl alcohol, i-propyl alcohol, n-butyl alcohol, i-butyl alcohol, 2-ethyl butanol and 2-ethyl hexanol.

Examples of the amino resin to be used in the composition (A) are preferably etherified melamine resins, e.g. those etherified to an extent of etherifying 3 to 6 methylol groups out of 6 methylol groups.

The proportions of the neutralized carboxyl-containing resin and the amino resin in the composition (A) are about 50 to about 90% by weight, or in view of film properties, preferably about 60 to about 85% by weight, of the former, and about 50 to about 10% by weight, preferably about 40 to about 15% by weight, of the latter, based on the combined weight of the two resins calculated as solids.

The first base coating composition (A) contains a metallic pigment or like pigment, in addition to the neutralized carboxyl-containing resin and the amino resin, to impart the specific hiding power to the cured metallic coating film.

Useful metallic pigments are, for example, aluminum powders, bronze powders, copper powders, tin powders, lead powders, zinc powders, iron phosphate powders, micaceous iron oxide particles and titanium oxide-coated mica particles. At least one of them can be used.

Optionally the metallic pigment may be used in combination with coloring pigments and/or extender pigments. Examples of useful coloring pigments are titanium dioxide, carbon black, Phthalocyanine Blue, Phthalocyanine Green, Carbazole Violet, anthrapyridine, Azo Orange, Flavanthrone Yellow, Isoindoline Yellow, Azo Yellow, Indanthrone Blue, Dibromoanthanthrone Red, Perylene Red, Azo Red, Anthraquinone Red and Quinacridone Red. Examples of useful extender pigments are precipitated barium sulfate, barium carbonate, gypsum, clay, silica, white carbon, diatomaceous earth, talc, magnesium carbonate, alumina white and mica powders.

The pigment can be used in a suitable combination according to the specific substrate-hiding power, the desired color and other factors. Usually it is preferred to use a metallic pigment alone, or a metallic pigment and a coloring pigment in combination.

A suitable amount of the pigment to be used is one which results in 3% or less, preferably 1% or less, of light transmittance in a cured layer of the first base coating composition (A). The amount of the pigment to be used is variable depending on the type of pigment and can not be specifically determined. Usually the amount is 1 to 250 parts by weight, preferably 5 to 150 parts by weight, per 100 parts by weight of the resin solids content (total amount of the base resin and the crosslinking agent resin).

The term "transmittance of light" used herein refers to an average light transmittance defined as follows. A coating composition is applied to a glass plate to a thickness of 15 Am when cured. After curing, the coated glass plate is immersed in warm water at 60 to 70° C. Then the coating film is peeled and dried to give a cured coating film which is used as a sample. The sample is exposed to light at a wavelength of 400 to 700 nm and an average light transmittance (%) in the sample is measured using an autographic spectrophotometer (product of Hitachi, Ltd., "EPS-3T Model").

The first base coating composition (A) may contain various dye(s) when so required. Desirable dyes are those which are superior in resistance to light, solubility in water or in an organic solvent and the like.

The first base coating composition (A) is an organic solvent-based one and is prepared by dissolving or dispersing a neutralized carboxyl-containing resin, an amino resin, a metallic pigment and so on in an organic solvent. The first base coating composition (A) preferably has a nonvolatile concentration of about 20 to about 70% by weight at the time of application. The first base coating composition (A) is desirably a so-called high solid one which has a nonvolatile concentration adjusted to about 30 to about 70% by weight at the time of application in view of prevention of air pollution and saving of resources.

The organic solvent to be used in the invention can be any of conventional organic solvents used for coating compositions and include, for example, ester solvents, ether solvents, alcohol solvents, amide solvents, ketone solvents, aliphatic hydrocarbon solvents, alicyclic hydrocarbon solvents and aromatic hydrocarbon solvents. At least one solvent selected from them is used. Among them, preferred are hydrophilic organic solvents such as ethylene glycol monomethyl ether acetate, diethylene glycol monomethyl ether acetate, diethylene glycol monoethyl ether acetate, dioxane, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, methyl alcohol, ethyl alcohol, allyl alcohol, n-propyl alcohol, isopropyl alcohol, t-butyl alcohol, ethylene glycol, 1,2-propylene glycol, 1,2-propylene glycol monomethyl ether, 1,2-propylene glycol monoethyl ether, 1,2-propylene glycol monobutyl ether, 1,3-butylene glycol, 2,3-butylene glycol, hexylene glycol, hexanediol, dipropylene glycol, dipropylene glycol monomethyl ether, dipropylene glycol monoethyl ether, dipropylene glycol monobutyl ether, acetone and diacetone alcohol. These hydrophilic organic solvents are used either alone or in combination. The hydrophilic organic solvents to be used are those which dissolve in an amount of at least 50 parts by weight per 100 parts by weight of water at 20° C. The first base coating composition (A) contains the hydrophilic organic solvent in a proportion of at least 20% by weight, preferably 40 to 100% by weight, based on the combined weight of organic solvents at the time of application.

According to the coating method of the invention, the first base coating composition (A) is applied to a metal substrate coated with a cationic electrodepositable coating composition and optionally an intercoat composition. The applicator is preferably any of atomizing coaters such as air spray coaters, airless spray coaters, air-atomizing electrostatic coating devices and rotary electrostatic coating devices. Suitably the first base composition (A) is adjusted at the time of application to a viscosity of about 15 to about 60 seconds, preferably about 15 to about 35 seconds (Ford cup #4 at 20° C.). The film thickness is about 2 to about 60 pm, preferably about 5 to about 25 pm when cured.

The second base coating composition (B) is applied to the coating surface of the first base coating composition (A) layer according to the method of the invention. The second base coating composition (B) is an aqueous thermosetting coating composition which shows a transparency which is commensurate with a light transmittance of 10 to 95% in a cured coating film. The second base coating composition (B) comprises an aqueous base resin, a crosslinking agent, a pigment and so on. Water is used as a main solvent.

Suitable aqueous base resins as the component for the second base coating composition (B) are, for example, water-soluble or water-dispersible acrylic resins, water-soluble or water-dispersible polyester resins and the like.

Water-soluble or water-dispersible acrylic resins useful herein include all of conventional resins. Typical examples of water-soluble acrylic resins are those prepared by polymerizing at least one polymerizable monomer selected from α,β-ethylenically unsaturated carboxylic acids, hydroxyalkyl esters thereof and other α,β-ethylenically unsaturated monomers, the acrylic resin having an acid value of about 20 to about 100 mgKOH/g and a hydroxyl value of about 20 to about 200 mgKOH/g. If the acrylic resin has an acid value of less than 20 mgKOH/g, the resin is hard to dissolve in water, whereas the acrylic resin having an acid value of more than 100 mgKOH/g reduces the water resistance of coating film due to remaining carboxyl group.

Examples of polymerizable monomers useful in the preparation of the water-soluble acrylic resin are α,β-ethylenically unsaturated carboxylic acids such as (meth) acrylic acid, maleic acid and itaconic acid; hydroxyalkyl esters of α,β-ethylenically unsaturated carboxylic acids such as 2-hydroxyethyl (meth)acrylate and 2-hydroxypropyl (meth)acrylate; alkyl esters of α,β-ethylenically unsaturated carboxylic acids such as methyl (meth)acrylate, ethyl (meth) acrylate, n-butyl (meth)acrylate, isobutyl (meth)acrylate, 2-ethylhexyl (meth)acrylate, lauryl (meth)acrylate and decyl (meth)acrylate; acrylamide derivatives such as (meth) acrylamide, N-methylol (meth)acrylamide and diacetone acrylamide; glycidyl esters of α,β-ethylenically unsaturated carboxylic acids such as glycidyl (meth)acrylate; vinyl esters of saturated carboxylic acids such as vinyl acetate and vinyl propionate; aromatic unsaturated monomers such as styrene, α-methylstyrene and vinyltoluene.

The polymerization reaction can be carried out using the above-mentioned monomers in an organic solvent in the presence of a radical polymerization initiator such as azobisisobutyronitrile, benzoyl peroxide, dibutyl peroxide and the like. The organic solvent to be used is one which is compatible with water such as butyl cellosolve, ethylene glycol monobutyl ether, diethylene glycol monoethyl ether, diethylene glycol monobutyl ether, 1,2-propylene glycol monomethyl ether and the like.

The water-soluble acrylic resin thus obtained is neutralized with a basic substance such as ammonia, amines such as triethylamine, monoethanolamine, diethanolamine, triethanolamine, dimethylaminoethanol and hydroxides of alkali metals such as sodium hydroxide. Then, water or optionally an organic solvent compatible with water is added to the resin to dilute the resin to a suitable solids content.

Useful water-dispersible acrylic resins are, for example, conventional acrylic resins prepared in the conventional manner by emulsion polymerization of the foregoing polymerizable unsaturated monomers as the raw material for the water-soluble acrylic resin in an aqueous medium in the presence of a dispersion stabilizer. Useful dispersion stabilizers are, for example, at least one member selected from the group consisting of ionic low-molecular surface active substances, ionic high-molecular surface active substances, non-ionic low-molecular surface active substances and non-ionic high-molecular surface active substances, and water-soluble resins.

Usable water-soluble or water-dispersible polyester resins include, for example, polyester resins having an acid value of about 15 to about 100 mgKOH/g and a hydroxyl value of about 20 to about 200 mgKOH/g, among those described above as the base resin for the first base coating composition (A). The polyester resin is neutralized before use.

An amino resin can be suitably used as the crosslinking agent for the second base coating composition (B).

The amino resin to be used can be any of amino resins for use in the first base coating composition (A). The amino resin for use in the second base coating composition (B) may be an etherified melamine resin, e.g. preferably those etherified to such extent that 2 to 5.5 methylol groups out of 6 groups have been etherified.

As to the proportions of the aqueous base resin and the amino resin as the crosslinking agent in the second base coating composition (B), the proportion of the base resin is about 50 to about 90% by weight, preferably about 60 to about 85% by weight, while the proportion of the amino resin is about 50 to about 10% by weight, preferably about 40 to about 15% by weight.

The second base coating composition (B) preferably contains a metallic pigment, a coloring pigment or like pigments which leads to the formation of cured coating film having a transparency corresponding to a light transmittance of 10 to 95%. Preferably the total amount of pigments is so small that the layer of the coating composition (B) is transparent with the result that the color of first base coating composition layer can be seen through the second base coating composition layer. Desirably the total amount of pigments in the second base coating composition (B) is smaller than in the first base coating composition (A).

Stated more specifically, the pigments are preferably used in an amount which brings about a light transmittance of 10 to 95%, preferably 20 to 90% in a cured layer of second base coating composition (B). The amount is variable depending on the type of pigments to be used and can not be specifically determined. Usually the amount is 0.01 to 100 parts by weight, preferably 0.1 to 80 parts by weight, per 100 parts by weight of the resin solid (total amount of the base resin and the crosslinking agent resin), and the amount is preferably smaller than in the first base coating composition (A).

The second base coating composition (B) may contain various dyes when so required.

The second base coating composition (B) can be applied with use of the same coater as used in application of the first base coating composition (A). A preferred viscosity of the second base coating composition (B) at the time of application is about 10 to about 50 seconds in terms of Ford cup #4 (20° C.). The film thickness is about 5 to about 30 $\mu$m, preferably about 10 to about 20 $\mu$m, when cured.

Desirably the first base and the second base coating compositions (A) and (B) have an affinity for each other. More specifically, the base resins and the crosslinking agent resins in the coating compositions (A) and (B) are entirely or partly the same as or similar to each other, or even if the other is of different type, there exists an affinity between the two compositions.

The clear coating composition (C) is applied to the coating surface of the second base coating composition (B) layer according to the method of the invention. The clear coating composition (C) forms a clear top coating layer which contributes to improvements in the properties of multi-layer film such as esthetic property, finished appearance, weatherability, chemical resistance, water resistance, moisture resistance and so on. The clear coating composition (C) is a thermosetting composition comprising a base resin, a crosslinking agent and other components. An organic solvent is used as a solvent in the composition (C).

A preferred base resin in the clear coating composition (C) is a hydroxyl-containing acrylic resin. Suitable acrylic resins are, for example, copolymers prepared by copolymerizing a hydroxyl-containing polymerizable unsaturated monomer and other polymerizable unsaturated monomers. At least one of these monomers is acrylic. It is preferred that the resin have a number average molecular weight of about 2,000 to about 100,0000 and a hydroxyl value of about 50 to about 200 mgKOH/g.

Examples of the hydroxyl-containing polymerizable unsaturated monomer are hydroxyalkyl (having 2 to 8 carbon atoms) esters of (meth)acrylic acids such as 2-hydroxyethyl (meth)acrylate, 2-hydroxypropyl (meth)acrylate, 3-hydroxypropyl (meth)acrylate and hydroxybutyl (meth)acrylate; monoesters of polyether polyols such as polyethylene glycol, polypropylene glycol or polybutylene glycol with unsaturated carboxylic acids such as (meth)acrylic acid; monoethers of the above-mentioned polyether polyols with hydroxyl-containing unsaturated compounds such as 2-hydroxyethyl (meth)acrylate; addition reaction products of $\alpha,\beta$-unsaturated carboxylic acids with monoepoxy compounds such as "Cardula E10" (trade name, product of Shell Chemical Co., Ltd.) and a-olefin epoxide; addition reaction products of glycidyl (meth)acrylate with monobasic acids such as acetic acid, propionic acid, p-t-butylbenzoic acid and fatty acids; monoesters or diesters of acid anhydride group-containing unsaturated compounds such as maleic anhydride and itaconic anhydride with glycols such as ethylene glycol, 1,6-hexanediol and neopentyl glycol; hydroxyalkyl vinyl ethers such as hydroxyethyl vinyl ether; chlorine- and hydroxyl-containing monomers such as 3-chloro-2-hydroxypropyl (meth)acrylate; allyl alcohol and so on. Examples of other polymerizable unsaturated monomers are alkyl or cycloalkyl (having 1 to 24 carbon atoms) esters of (meth)acrylic acids such as methyl (meth)acrylate, ethyl (meth)acrylate, n-butyl (meth)acrylate, i-butyl (meth)acrylate, t-butyl (meth)acrylate, cyclohexyl (meth)acrylate, 2-ethylhexyl (meth)acrylate, lauryl (meth) acrylate, stearyl (meth)acrylate and decyl (meth)acrylate; (meth)acrylamides such as (meth)acrylamide, N-methyl (meth)acrylamide, N-ethyl (meth)acrylamide, diacetone acrylamide, N-methylol (meth)acrylamide or N-butoxymethyl (meth)acrylamide; glycidyl group-containing vinyl monomers such as glycidyl (meth)acrylate, glycidyl (meth)acrylamide and allyl glycidyl ether; carboxyl-containing vinyl monomers such as (meth)acrylic acid, maleic acid, itaconic acid and crotonic acid; vinyl monomers such as styrene, vinyltoluene, vinyl propionate, a-methyl styrene, vinyl acetate, (meth)acrylonitrile, vinyl pivalate and "VeoVa" monomer (trade name, product of Shell Chemical Co., Ltd.).

An amino resin is preferably used as the crosslinking agent in the clear coating composition (C). The amino resins exemplified above for the first base coating composition (A) can be suitably used.

When required, the clear coating composition (C) may contain additives such as defoaming agents, leveling agents and like surface control agents; thickeners, sagging inhibitors and like rheology control agents; ultraviolet absorbers; light stabilizers and the like.

The clear coating composition (C) is provided in an organic solvent form and can be prepared by dissolving or dispersing the base resin, crosslinking agent and the like in an organic solvent. The clear coating composition (C) is preferably a so-called high solid one which has a nonvolatile concentration adjusted to about 35 to about 80% by weight, preferably about 40 to about 80% by weight at the time of application in view of prevention of air pollution and saving of resources.

The organic solvent to be used can be any of conventional organic solvents used for coating compositions and include, for example, ester solvents, ether solvents, alcohol solvents, amide solvents, ketone solvents, aliphatic hydrocarbon solvents, alicyclic hydrocarbon solvents and aromatic hydrocarbon solvents. At least one solvent selected from them is used.

The clear coating composition (C) can be applied with use of the same coater as used in application of the first base coating composition (A). A preferred viscosity of the clear coating composition (C) at the time of application is about 15 to about 60 seconds in terms of Ford cup #4 (20° C.). A preferred film thickness is about 5 to about 50 μm when cured.

The method of forming a multi-layer metallic coating film according to the invention is characterized by a 3-coat system comprising the steps of applying the first base coating composition (A), the second base coating composition (B) and the clear coating composition (C) in this order over a specific metal substrate. The method of the invention can be suitably conducted according to a 3-coat 1-bake system or a 3-coat 2-bake system as described below.

According to one of preferred embodiments of the invention, the 3-coat 1-bake system may be conducted which comprises the steps of applying the first base coating composition (A) to the substrate, applying the second base coating composition (B) to the first base coating layer without curing the layer, pre-drying the two coating layers at 50 to 100° C. while substantially not curing the two layers, applying the clear coating composition (C), and heating the 3 coating layers of compositions (A), (B) and (C) to cure them at the same time.

In the 3-coat 1-bake system, after application of first base coating composition (A), the coated substrate is properly set and then the second base coating composition (B) is applied to the uncured coating layer. The uncured two coating layers of coating compositions (A) and (B) are essentially pre-dried at a temperature of 50 to 100° C. after application of coating composition (B) and before application of clear coating composition (C). Due to this pre-drying, the two coating layers remain substantially free of curing by crosslinking and show a gel fraction of about 5% by weight or less. A suitable pre-drying time is about 3 to about 30 minutes. Then after the clear coating composition (C) is applied, the three coating layers of coating compositions (A), (B) and (C) are suitably set and heated to about 120 to about 180° C. for about 15 to about 45 minutes for curing by crosslinking at the same time. In this way, a multi-layer metallic coating film is formed. The setting may be conducted as by leaving the coated substrate to stand at room temperature.

According to another preferred embodiment of the invention, the 3-coat 2-bake system may be conducted which comprises the steps of applying the first base coating composition (A) to the substrate, applying the second base coating composition (B) without curing the first base coating composition layer, heating the two coating layers for curing, applying the clear coating composition (C), and heating the coating layer of composition (C) for curing.

More specifically stated, the 3-coat 2-bake system is carried out as follows. After application of first base coating composition (A), the coated substrate is properly set, and the second base coating composition (B) is applied to the uncured coating layer. Then after proper setting, the two coating layers of compositions (A) and (B) are heated at a temperature of about 120 to about 180° C. for about 15 to about 45 minutes for simultaneous curing by crosslinking. Thereafter the clear coating composition (C) is applied, and then after proper setting, the coating layer of composition (C) is heated at a temperature of about 120 to about 180° C. for about 15 to about 45 minutes and cured by crosslinking. In this way, a multi-layer metallic coating film is formed. The setting may be conducted as by leaving the coated substrate to stand at room temperature.

When the method for forming a multi-layer metallic coating film according to the invention is carried out, a multi-layer metallic coating film can be formed on a metal substrate, the coating film being remarkably improved in the depth feeling, distinctness-of-image gloss, brilliant luster and the like, thus enhanced in esthetic property and excellent in surface smoothness, water resistance and like properties. The method of the invention is feasible with high coating efficiency and can advantageously overcome the problems on the prevention of air pollution and saving of resources. Further the method of the invention can be widely used to coat metal substrates such as motor vehicles, bicycles, electric appliances, etc.

BEST MODE FOR CARRYING OUT THE INVENTION

The present invention is described below in more detail with reference to the following preparation examples, examples and comparative examples wherein the parts and percentages are all by weight.

PREPARATION EXAMPLE 1

(Production of metal substrate)

"Elecron #9400" (trade name for polyamide-modified epoxy resin/blocked polyisocyanate cationically electrodepositable coating composition manufactured by Kansai Paint Co., Ltd.) was diluted with deionized water or the like to a solid concentration of about 16% to give a cationically electrodepositable coating composition bath.

A steel plate with a surface treated by chemical conversion with "Bonderite #3030" (trade name for a zinc phosphate treating agent manufactured by Nippon Parker Rising Co., Ltd.) was immersed in the obtained cationically electrodepositable coating composition bath. The steel plate held at a pH of 5.5 to 8.0 was coated in the conventional manner by cationic electrodeposition. The film thickness was about 20 μm on cured basis. After withdrawal from the bath, the coated steel plate was washed with water and heated to about 175° C. for 20 minutes for curing. The obtained plate is hereinafter referred to as "substrate I".

The cured surface of electrodeposited layer on substrate I was air-sprayed with an organic solvent-based intercoat composition "TP-37" (trade name for polyester resin/melamine resin intercoat composition manufactured by Kansai Paint Co., Ltd.) adjusted to a viscosity of 20 seconds (Ford cup #4/20° C.) to give a coating layer with a thickness of about 30 Mm when cured. The coated substrate was left to stand at room temperature for about 10 minutes and heated at 140° C. for 30 minutes for curing. The thus coated substrate is hereinafter referred to as "substrate II".

PREPARATION EXAMPLE 2
(Preparation of carboxyl-containing acrylic resin)

Sixty parts of butyl cellosolve was placed in a reactor and heated to 120° C. The following monomer mixture was added using a quantitative pump over a period of 3 hours.

| Methyl methacrylate | 30 parts |
| Ethyl acrylate | 23 parts |
| n-Butyl acrylate | 30 parts |
| Hydroxyethyl methacrylate | 12 parts |
| Acrylic acid | 5 parts |
| α,α'-Azobisisobutyronitrile | 2 parts |

The above procedure gave an acrylic resin solution (a-1) having a resin solids content of 60%. The acrylic resin had an acid value of 40 mgKOH/g, a hydroxyl value of 52 mgKOH/g and a number average molecular weight of about 10,000.

Dimethylaminoethanol (3.5 parts) was added to 100 parts of the acrylic resin solution (a-1) to neutralize 0.95 equivalent. The solution was diluted with isopropyl alcohol to give a neutralized acrylic resin solution (a-1N) having a resin solids content of 50%.

PREPARATION EXAMPLE 3
(Preparation of carboxyl-containing polyester resin)

A reactor was charged with 0.7 mole of neopentyl glycol, 0.3 mole of trimethylol propane, 0.4 mole of phthalic anhydride and 0.5 mole of adipic acid. The contents of the reactor were reacted at 200 to 230° C. for 5 hours. After addition of 0.03 mole of trimellitic anhydride, the mixture was reacted at 180° C. for a further 1 hour. Butyl cellosolve was added to give a polyester resin solution (b-1) having a resin solids content of 70%. The resin had an acid value of 40 mgKOH/g, a hydroxyl value of 141 mgKOH/g and a number average molecular weight of about 6,000.

Dimethylaminoethanol (4 parts) was added to 100 parts of the polyester resin solution (b-1) to neutralize 0.9 equivalent. The solution was diluted with isopropyl alcohol to give a neutralized polyester resin solution (b--N) having a resin solids content of 60%.

PREPARATION EXAMPLE 4
(Preparation of first base coating composition (A))

First base coating compositions (A-1) and (A-2) of the invention and comparative coating compositions (A-3) to (A-5) were prepared using the components listed in Table 1 in the amounts indicated therein.

TABLE 1

| Coating composition | A-1 | A-2 | A-3 | A-4 | A-5 |
|---|---|---|---|---|---|
| Base resin | | | | | |
| Neutralized acrylic resin solution (a-1N) | 140 | | 140 | | |
| Acrylic resin solution (a-1) | | | | 117 | |
| Neutralized polyester resin solution (b-1N) | | 117 | | | |
| Polyester resin solution (b-1) | | | | | 100 |
| Crosslinking agent "Cymel 370" | 34 | 34 | 34 | 34 | 34 |
| Pigment | | | | | |
| "Alupaste 891K" | 20 | 5 | 20 | 20 | 5 |
| "Blue G316" | | 10 | | | 10 |
| "BP-1300" | | 2 | | | 2 |
| Diluting solvent | | | | | |
| Isopropyl alcohol | 129 | 125 | | 140 | 120 |
| Deionized water | | | 180 | | |
| Solids content in coating composition (wt %) | 35 | 40 | 28 | 36 | 43 |
| Viscosity of coating composition (sec., Ford cup #4/20° C.) | 25 | 25 | 25 | 25 | 25 |
| Light transmittance (%) in 15 μm-thick cured coating film | 0.1> | 0.1> | 0.1> | 0.1> | 0.1> |

The amounts of the base resins, crosslinking agent, pigments and diluting solvents used are expressed in "part" in Table 1. "Cymel 370" (trade name, product of Mitsui Cytech Co., Ltd.) in Table 1 is a methylated melamine resin having 1.7 triazine nuclei on the average, an etherification degree of 77% and a solids content of 88%. "Alupaste 891K" (trade name, product of Toyo Aluminum Co., Ltd.) is an aluminum paste having a solids content of 65%. "Blue G316" (trade name, product of Sanyo Shikiso Co., Ltd.) is a blue pigment containing Phthalocyanine Blue as an active ingredient. "BP-1300" (trade name, product of Cabbot Co., Ltd.) is a carbon black pigment.

PREPARATION EXAMPLE 5
(Preparation of second base coating composition (B))

(1) A reactor was charged with 140 parts of deionized water, 2.5 parts of 30% "Newcol 707SF" (trade name for a surfactant manufactured by Nippon Nyukazai Co., Ltd.) and 1 part of the below-mentioned monomer mixture (1). The mixture was mixed with stirring in a nitrogen gas stream. Then, 3 parts of a 3% aqueous solution of ammonium persulfate was added at 60° C. After the mixture was heated to 80° C., the reactor was charged with a monomer emulsion comprising 79 parts of the following monomer mixture (1), 2.5 parts of 30% "Newcol 707SF", 4 parts of a 3% aqueous solution of ammonium persulfate and 42 parts of deionized water using a quantitative pump over a period of 4 hours. After addition, the mixture was aged for 1 hour. Then 20.5 parts of the following monomer mixture (2) and 4 parts of a 3% aqueous solution of ammonium persulfate were simultaneously added dropwise at 80° C. to the reactor in a parallel manner over 1.5 hours. After completion of addition, the mixture was aged for 1 hour. The aged mixture was diluted with 30 parts of deionized water. The diluted solution was passed through a 200 mesh nylon cloth filter at 30° C. Deionized water was added to the filtrate and the filtrate was adjusted to a pH of 7.5 with dimethylaminoethanol to give an acrylic resin emulsion (c-1) having a nonvolatile content of 20%. The acrylic resin had an average particle size of 0.1 μm, an acid value of 26 mgKOH/g and a hydroxyl value of 24 mgKOH/g.

Monomer mixture (1)

| Methyl methacrylate | 55 parts |
|---|---|
| Styrene | 8 parts |
| n-Butyl acrylate | 9 parts |
| 2-Hydroxyethyl acrylate | 5 parts |
| 1,6-Hexanediol diacrylate | 2 parts |
| Methacrylic acid | 1 part |

Monomer mixture (2)

| Methyl methacrylate | 5 parts |
|---|---|
| n-Butyl acrylate | 7 parts |
| 2-Ethylhexyl acrylate | 5 parts |
| Methacrylic acid | 3 parts |
| 30% "Newcol 707SF" | 0.5 part |

(2) Second base coating compositions (B-1) and (B-2) and comparative coating composition (B-3) were prepared using the acrylic resin emulsion (c-1) and the components shown in Table 2 in the amounts indicated therein.

TABLE 2

| Coating composition | B-1 | B-2 | B-3 |
|---|---|---|---|
| Base resin | | | |
| Neutralized acrylic resin solution (a-1N) | 50 | 50 | 50 |
| Neutralized polyester resin solution (b-1N) | 50 | 50 | 50 |
| Acrylic resin emulsion (c-1) | 100 | 100 | 100 |
| Crosslinking agent "Cymel 370" | 34 | 34 | 34 |
| Pigment | | | |
| "Alupaste 891K" | | 2 | 5 |
| "Blue G316" | 5 | | 10 |
| "BP-1300" | | | 2 |
| Diluting solvent | | | |
| deionized water | 220 | 220 | 240 |
| Solids content in coating composition (wt %) | 25 | 25 | 25 |
| Viscosity of coating composition (sec., Ford cup #4/20° C.) | 30 | 30 | 30 |
| Light transmittance (%) in 15 μm-thick cured coating film | 40 | 45 | 0.1> |

PREPARATION EXAMPLE 6

(Preparation of clear coating composition (C))

(1) Forty parts of "Swasol #1000" (trade name for a hydrocarbon solvent manufactured by Maruzen Oil Co., Ltd.) was placed in a reactor and heated 120° C. To the reactor was added the following monomer mixture over a period of 3 hours using a quantitative pump.

| Styrene | 30 parts |
|---|---|
| n-Butyl acrylate | 35 parts |
| 2-Ethylhexyl acrylate | 10 parts |
| Hydroxyethyl acrylate | 25 parts |
| α,α"-Azobisisobutyronitrile | 4 parts |

The above procedure gave an acrylic resin solution (a-2) having a resin solids content of 70%. The acrylic resin had a hydroxyl value of 120 mgKOH/g and a number average molecular weight of about 6,000.

(2) A reactor was charged with 58 parts of 60% "Uban 28-60" (trade name for a butylated melamine resin solution which is 3 in average triazine nucleus number and has an etherification degree of 70%, product of Mitsui Toatsu Chemical Co., Ltd.), 30 parts of n-heptane and 0.15 part of benzoyl peroxide. After the mixture was heated to 95° C., the following monomer mixture was added dropwise over 3 hours.

| Styrene | 15 parts |
|---|---|
| Acrylonitrile | 9 parts |
| Methyl methacrylate | 13 parts |
| Methyl acrylate | 15 parts |
| n-Butyl acrylate | 1.8 parts |
| 2-Hydroxyethyl methacrylate | 10 parts |
| Acrylic acid | 1.2 parts |
| Benzoyl peroxide | 0.5 part |
| n-Butanol | 5 parts |
| "Shellsol 140" | 30 parts |
| n-Heptane | 9 parts |

One hour after dropwise addition of the monomer mixture, a mixture of 0.65 part of t-butyl peroctoate and 3.5 parts of "Shellsol 140" (trade name for hydrocarbon solvent manufactured by Shell Chemical Co., Ltd.) was added dropwise over one hour. The mixture was stirred for 2 hours while maintaining the temperature at 95° C. Then, 34 parts of the solvent was removed under a reduced pressure, giving a nonaqueous dispersion of acrylic resin (d-1) having a resin solids content of 60% and a viscosity of A (Gardner-Holdt bubble viscometer).

(3) A clear coating composition (C-1) was prepared using the following components in the amounts shown.

| 70% acrylic resin solution (a-2) | 57 parts |
|---|---|
| 60% nonaqueous dispersion of acrylic resin (d-1) | 50 parts |
| "Cymel 303" | 30 parts |
| 25% solution of dodecylbenzenesulfonic acid | 4 parts |
| "BYK-300" | 0.5 part |

The foregoing mixture was adjusted with "Swasol #1000" to a viscosity of 30 seconds (Ford cup #4/20° C.), giving a clear coating composition (C-1) with a resin solids content of 55%.

Among said components, "Cymel 303" (trade name, product of Mitsui Cytech Co., Ltd.) is a methylated melamine resin having an average triazine nucleus number of 1.2 and an etherification degree of 100%, and "BYK-300" is a leveling agent (trade name, product of Bic Chemie Japan). Examples 1 and 2 and Comparative Examples 1 to 4

Multi-layer metallic coating films were prepared by carrying out the coating operation described below at 60% RH, 75% RH or 90% RH.

The substrate II obtained in Preparation Example 1 was air-sprayed with any one of the first base coating composition (A-1) or (A-2) and the comparative coating compositions (A-3) to (A-5) adjusted to a viscosity of 25 seconds (Ford cup #4/20° C.) to give a coating film of about 20 μm thickness (when cured). The coated substrate was left to stand at room temperature for about 10 minutes. In Comparative Example 4, the first base coating composition was not applied.

The uncured surface of first base coating composition layer was air-sprayed with any one of second base coating composition (B-1) or (B-2) and comparative coating composition (B-3) adjusted to a viscosity of 30 seconds (Ford cup #4/20° C.) to give a coating film with a thickness of about 15 4m when cured. The coated substrate was pre-dried at 80° C. for about 10 minutes.

Subsequently the uncured surface of second base coating composition layer was air-sprayed with the clear coating composition (C-1) adjusted to a viscosity of 30 seconds (Ford cup #4/20° C.) to give a coating film with a thickness of about 15 μm when cured. The coated substrate was left to stand at room temperature for about 10 minutes. Thereafter the coated substrate was heated to 140° C. for 30 minutes, whereby the three coating layers of first and second base coating compositions and clear coating composition were concurrently cured by crosslinking.

Thus, a multi-layer metallic coating film was formed according to the 3-coat 1-bake system.

Performance tests were carried out to evaluate the properties of the multi-layer metallic coating films obtained in Examples 1 and 2 and Comparative Examples 1 to 4 by the following methods.

Depth feeling: The coated plate was visually inspected and evaluated according to the following criteria.

A: Excellent in depth feeling for notably impressive contrast in lightness between highlight and shade;
B: Good in depth feeling for slightly impressive contrast in lightness between highlight and shade; and
C: Lack of depth feeling for the absence of contrast in lightness between highlight and shade.

Brilliant luster: The coated plate was visually inspected and evaluated according to the following criteria.

A: Excellent in brilliant luster;
B: Good in brilliant luster; and
C: Poor in brilliant luster.

Surface smoothness: The surface smoothness was measured using a tension meter (product of Renault, France). The greater the value is, the higher the surface smoothness is.

Distinctness-of-image gloss: Measured with a distinctness-of-image gloss meter "P.G.D-IV" (product of Nihon Shikisai Kenkyusho). The greater the value is, the higher the distinctness-of-image gloss is.

Water resistance: The coated plate was immersed in warm water at 40° C. for 240 hours, and the state of coating surface was visually evaluated according to the following criteria.

A: No change on the coating surface;
B: Small degrees of dullness, blister or like flaws on the coating surface; and
C: Noticeable degrees of dullness, blister or like flaws on the coating surface.

The coating compositions used in the tests and the test results are shown in Table 3.

TABLE 3

| | | | Example | | Comparative Example | | | |
|---|---|---|---|---|---|---|---|---|
| | | | 1 | 2 | 1 | 2 | 3 | 4 |
| Coating composition used | | | | | | | | |
| First base coating comp. | | | A-1 | A-2 | A-3 | A-4 | A-5 | None |
| Second base coating comp. | | | B-1 | B-2 | B-1 | B-2 | B-2 | B-3 |
| Clear coating comp. | | | C-1 | C-1 | C-1 | C-1 | C-1 | C-1 |
| Film properties | | | | | | | | |
| Depth | Humidity | 60 | A | A | B | B | B | B |

TABLE 3-continued

| | | | Example | | Comparative Example | | | |
|---|---|---|---|---|---|---|---|---|
| | | | 1 | 2 | 1 | 2 | 3 | 4 |
| feeling | (% RH) | 75 | A | A | C | B | B | C |
| | | 90 | A | A | C | C | C | C |
| Brilliant luster | Humidity (% RH) | 60 | A | A | C | B | B | B |
| | | 75 | A | A | C | C | C | C |
| | | 90 | A | A | C | C | C | C |
| Distinctness-of-image gloss | Humidity (% RH) | 60 | 1.0 | 1.0 | 0.8 | 0.7 | 0.8 | 0.8 |
| | | 75 | 1.0 | 1.0 | 0.8 | 0.7 | 0.7 | 0.7 |
| | | 90 | 1.0 | 1.0 | 0.7 | 0.7 | 0.7 | 0.7 |
| Surface smoothness | Humidity (% RH) | 60 | 18 | 18 | 16 | 17 | 16 | 16 |
| | | 75 | 18 | 19 | 16 | 17 | 17 | 16 |
| | | 90 | 19 | 19 | 17 | 17 | 17 | 16 |
| Water resistance | Humidity (% RH) | 60 | A | A | B | A | A | A |
| | | 75 | A | A | B | A | A | A |
| | | 90 | A | A | B | A | A | A |

EXAMPLES 3 AND 4

Multi-layer metallic coating films were formed at 60% RH, 75% RH or 90% RH by conducting the following coating operation.

The substrate I obtained in Preparation Example 1 was air-sprayed with the first base coating composition (A-1) or (A-2) adjusted to a viscosity of 25 seconds (Ford cup #4/20° C.) to give a coating film of about 20 μm thickness when cured. The coated substrate was left to stand at room temperature for about 10 minutes.

Subsequently the uncured surface of first base coating composition layer was air-sprayed with the second base coating composition (B-1) or (B-2) adjusted to a viscosity of 30 seconds (Ford cup #4/20° C.) to give a coating film with a thickness of about 15 μm when cured. The coated substrate was left to stand at room temperature for about 10 minutes. The coated substrate was heated to 140° C. for 30 minutes so that the two coating layers of first and second base coating compositions were concurrently cured by crosslinking.

Then, the cured surface of second base coating composition layer was air-sprayed with the clear coating composition (C-1) adjusted to a viscosity of 30 seconds (Ford cup #4/20° C.) to give a coating film with a thickness of about 15 μm when cured. The coated substrate was left to stand at room temperature for about 10 minutes. Then the coated substrate was heated to 140° C. for 30 minutes for curing by crosslinking.

Thus, a multi-layer metallic coating film was formed according to the 3-coat 2-bake system.

Performance tests were carried out to evaluate the properties of the multi-layer metallic coating films obtained in Examples 3 and 4 by the above-mentioned methods.

The coating compositions used in the tests and the test results are shown in Table 4.

TABLE 4

| | Example | |
|---|---|---|
| | 3 | 4 |
| Coating composition used | | |
| First base coating comp. | A-1 | A-2 |

TABLE 4-continued

| | | | Example | |
| --- | --- | --- | --- | --- |
| | | | 3 | 4 |
| Second base coating comp. | | | B-1 | B-2 |
| Clear coating comp. | | | C-1 | C-1 |
| Film properties | | | | |
| Depth feeling | Humidity (% RH) | 60 | A | A |
| | | 75 | A | A |
| | | 90 | A | A |
| Brilliant luster | Humidity (% RH) | 60 | A | A |
| | | 75 | A | A |
| | | 90 | A | A |
| Distinctness-of-image gloss | Humidity (% RH) | 60 | 1.0 | 1.0 |
| | | 75 | 1.0 | 1.0 |
| | | 90 | 1.0 | 1.0 |
| Surface smoothness | Humidity (% RH) | 60 | 18 | 18 |
| | | 75 | 19 | 19 |
| | | 90 | 19 | 19 |
| Water resistance | Humidity (% RH) | 60 | A | A |
| | | 75 | A | A |
| | | 90 | A | A |

What is claimed is:

1. A method for forming a multi-layer metallic coating film, the method being characterized by a 3-coat system comprising the steps of applying the following coating compositions (A), (B) and (C) in this order to a metal substrate coated with a cationically electrodepositable coating composition; (A) an organic solvent-based thermosetting metallic first base coating composition which comprises a neutralized carboxyl-containing resin having an acid value of 5 to 100 mgKOH/g, an amino resin and a metallic pigment, the composition having a substrate-hiding power corresponding to up to 3% transmittance of light at a wavelength of 400 to 700 nm in a 15 μm-thick cured coating film, (B) an aqueous thermosetting second base coating composition which has a transparency corresponding to 10 to 95% transmittance of light at a wavelength of 400 to 700 nm in a 15-μm thick cured coating film, and (C) an organic solvent-based thermosetting clear coating composition.

2. The method according to claim 1 wherein a 3-coat 1-bake system is conducted which comprises the steps of applying the first base coating composition (A) to the substrate, applying the second base coating composition (B) to the layer of first base coating composition (A) without curing the layer, pre-drying the two coating layers at 50 to 100° C. while substantially not curing the two layers, applying the clear coating composition (C), and heating the 3 coating layers of compositions (A), (B) and (C) to cure them at the same time.

3. The method according to claim 1 wherein a 3-coat 2-bake system is conducted which comprises the steps of applying the first base coating composition (A) to the substrate, applying the second base coating composition (B) without curing the layer of first base coating composition (A), heating the two coating layers for curing, applying the clear coating composition (C), and heating the coating layer of composition (C) for curing.

4. The method according to claim 1 wherein the first base coating composition (A) contains 1 to 250 parts by weight of the pigment per 100 parts by weight of the resin solids content.

5. The method according to claim 1 wherein the second base coating composition (B) contains 0.01 to 100 parts by weight of the pigment per 100 parts by weight of the resin solids content.

6. An article coated by the method of claim 1.

* * * * *